(12) United States Patent
Blazquez Navarro et al.

(10) Patent No.: US 6,338,283 B1
(45) Date of Patent: Jan. 15, 2002

(54) SELF-CONTAINED ELECTRONIC SYSTEM FOR MONITORING PURGERS, VALVES AND INSTALLATIONS IN REAL TIME

(76) Inventors: Vincente Blazquez Navarro, Torrelaguna 61, 14 D, E-28027 Madrid; Jesus Almazan Sanchez, Guadiana 7, E-Pozuelo de Alarcon, both of (ES)

( * ) Notice: Subject to any disclaimer, the term of this patent is extended or adjusted under 35 U.S.C. 154(b) by 0 days.

(21) Appl. No.: 09/254,240

(22) PCT Filed: Jul. 18, 1997

(86) PCT No.: PCT/ES97/00181

§ 371 Date: Jul. 16, 1999

§ 102(e) Date: Jul. 16, 1999

(87) PCT Pub. No.: WO98/10218

PCT Pub. Date: Mar. 12, 1998

(30) Foreign Application Priority Data

Sep. 2, 1996 (ES) .............................. 9601878
Oct. 1, 1997 (ES) .............................. 9700044

(51) Int. Cl.[7] .............................................. F01K 13/00
(52) U.S. Cl. ..................................................... 73/865.8
(58) Field of Search .......................... 73/865.8, 1.172, 73/168; 137/171, 183, 551, 552, 557

(56) References Cited

U.S. PATENT DOCUMENTS

| 2,430,990 | A | * | 11/1947 | Grace, Jr. ................... 137/551 |
| 4,146,049 | A | * | 3/1979 | Kruse et al. ................. 137/551 |
| 4,783,990 | A | * | 11/1988 | Eberle et al. .................. 73/112 |
| 4,945,343 | A | * | 7/1990 | Rodriguez | |
| 5,288,333 | A | * | 2/1994 | Tanaka et al. | |
| 5,298,886 | A | * | 3/1994 | Uiki et al. ................... 137/557 |
| 5,353,628 | A | | 10/1994 | Bellows | |
| 5,409,037 | A | * | 4/1995 | Wheeler et al. ............. 137/551 |
| 5,908,980 | A | * | 6/1999 | Hwang et al. .............. 137/551 |

FOREIGN PATENT DOCUMENTS

| ES | 2011384 | | 1/1990 |
| GB | 2231407 | A | 11/1990 |
| GB | 2266956 | A | 11/1993 |

* cited by examiner

Primary Examiner—Robert Raevis
(74) Attorney, Agent, or Firm—Banner & Witcoff, Ltd.

(57) ABSTRACT

Self sufficient electronic system for monitoring and continuous surveillance of steam traps, valves and installations using fluids. The system comprises three essential elements: a multiple sensor, an electronic analyzer and an optional receiver. The sensor measures fluid conductivity, pressure and temperature. The electronic analyzer continously controls the status (pressure, temperature) and conductivity of fluid, supplying optical, acoustic and digital information, in situ or from a remote point, in accordance with the results of analysis carried out. The receiver centralizes and processes the signals emitted by the analyzer. The analyzer electronic circuits are fed by batteries recharged through photovoltaic cells incorporated in the equipment. The multiple probe also incorporates an ultrasonic sensor which detects ultrasounds generated in the steam trap or valve. The analyzer and the remote receiver also add the corresponding electronic circuits for a continuous surveillance of ultrasounds level. This system may be applied to the continuous surveillance and control of steam leaks in steam traps and, generally, to the control fluid flow in any installation. The system can solve the problem of automatic inspection and continuous monitoring of energy losses in steam traps, without human attention. It substantially reduces power consumption by detecting steam losses simultaneously and instantly at all points of installation.

6 Claims, 2 Drawing Sheets

SELF-CONTAINED ELECTRONIC SYSTEM FOR MONITORING PURGERS, VALVES AND INSTALLATIONS IN REAL TIME

The present specification refers to a patent of Invention corresponding to a new prototype of a self sufficient electronic system for the monitoring of steam traps, valves and installations, which can be applied to the remote control of fluids in all types of installations and specially to control the operation of all kinds of steam traps and to the instant detection of steam leaks in said elements.

Current technology dealing with the control of steam trap operation and with the detection of steam leakage through said steam traps is carried out by means of portable ultrasonic and pirometric detecting devices, which require the help of experts who must inspect and check one by one all the steam traps in the installation. This task is usually carried out every six months and it is very expensive, as it requires several months in the case of large installations such as petrol refineries, where several thousand steam traps are in service. An inspection of this type must be done on time and every six months, whereas a great amount of energy is lost through the steam traps when their failure occurs between two consecutive inspections.

Another way to control steam leaks and steam traps operation consists of the installation of fixed passive elements such as peephole or conductivity check type detecting devices. These devices are installed on line just upstream the steam trap, and detect the steam flow through steam traps. These elements require the help of expensive external devices for detection and analysis which are fed by auxiliary power sources, which, also, require expensive installation, and mainly require human attention for their correct operation. These types of elements placed upstream the steam traps require maintenance and their failure would require stopping the system for checking and repair. The background disclosed in the document GB-A-2 231 407 and similar documents do not solve the problem of monitoring steam traps, valves and installations in real time in an autonomous way.

The new prototype of a self sufficient electronic system for monitoring steam traps, valves and installation can be applied to any type of valve or fluid installation or to any type of steam trap and will solve satisfactorily all problems and inconveniences present in the systems described in the present technological state due to the fact that the system of present invention is a self sufficient system, with no need for auxiliary power source, which will not be mounted in line with steam trap, but on top of said steam trap as an independent fitting, so the system can be removed without having to stop or modify said steam trap working conditions. The system effects a continuous control on steam traps and remains fully operative without any energy consumption and in a warning condition, to detect any steam leak through a steam trap and send an immediate warning.

The new prototype, object of this invention, provides one or several of the following types of information: optical, acoustic or numeric coded. The optical information consists of an indicator, which can show several conditions (off, blinking, on, and ordinal) depending on fluid condition through steam traps or the installation. The acoustic information identifies the same parameters as the optical information by means of an audible tone system. The numeric coded information contains the same information as previously mentioned, and in addition a code for the identification of the steam trap or the spot where and when the failure has taken places said information also being sent to an optional receiver control panel for its further analysis and process.

The new prototype, object of this invention, is of great economical importance for four essential reasons:

a) Great energy savings due to an instant spotting and identification of steam losses.

b) Reduction of maintenance costs in steam traps due to an immediate detection of the failure in these elements, avoiding total interior destruction that can take place because of a continuous steam flow through them.

c) It avoids the pressurization of the return condensate collectors, created by steam leakage through steam traps. This pressurization affects very unfavourably to energy saving in the whole installation and makes it difficult, and sometimes impossible, the recovery of condensate residual energy.

d) Steam traps and valves are widely used in all types of industries, and therefore this new invention will be of wide application to industrial processes.

The following list describes in detail the new prototype object of this invention:

FIG. 1: Basic elements of the new prototype object of this invention.

FIG. 2: Schematics of the new prototype connected to a valve or a steam trap.

FIG. 3: Schematics of the new prototype connected to a thermostatic steam trap.

FIG. 4: Schematics of the new prototype connected to a monobloc steam trap.

The new prototype object of this invention comprises three basic elements: a multiple sensor or several single sensors (1), an electronic analyzer (2) and an optional receiver (3).

The multiple sensor (1) consists of one or several of the following elements:

A thermocouple, which detects flow temperature

An electrode, which detects flow conductivity

A probe which detects flow pressure

In addition, the multiple sensor detects ultrasonic sound from inside valves or installation, with the sensor not being in contact with steam flow.

The multiple sensor (1) is housed in a metal screwed body, which is connected to the pipe or to the monitored valve or steam trap body as indicated in FIGS. 2, 3 and 4. The multiple sensor is air tight so that once it is mounted it will not affect to normal operation of the installation, valve or steam trap, Said multiple sensor (1) is electrically and thermally insulated by means of an element made of ceramic or similar material to prevent heat being transmitted to the electronic analyzer (2).

The electronic analyzer (2) is to be screwed on top of the multiple sensor (1) and consists of:

a) a battery system charged by means of photovoltaic cells (4).

b) analysis and control electronic circuits.

c) optical and/or acoustic and/or numeric information indicator and emitter system.

The whole analyzer is protected from the exterior with a transparent cover. The analyzer, when not mounted, can be deactivated when required without internal manipulation. Once the system is activated, the same is placed on a warning condition and generates the information of at least one, or all the types of information already described which correspond to the different possible conditions of flow parameters. The electronic analyzer (2) works with an almost negligible current to guarantee the safety in the installation.

The receiver (3) remotely detects the coded numeric signals emitted by the analyzer (2) and gathers and processes said information in accordance with user's needs.

The new prototype, object of this invention, can also work with total success without the help of the receiver (3). Indeed, in this case the identification of the leaking steam trap is carried out by one or more of three types of information already indicated; visual, acoustic and numeric. Even in this case no means of additional detection or auxiliary equipment are required for an immediate spotting of steam leaks.

FIG. 2 shows a prototype of the new self sufficient electronic system mounted on a valve or steam trap (5) or on a pipe (6). Said system can be applied directly on a tube (6) or any other part of the installation.

The new prototype, object of this invention has a special interest for the monitoring and continuous surveillance of steam leaks in any type of steam traps. FIGS. 3 and 4 represent two examples for the application of two different types of steam traps, which can be extended to any other type of steam trap, valve or element of installation. In both cases, for further simplicity, a graphic representation is shown without the optional remote receiver.

Figure 1:
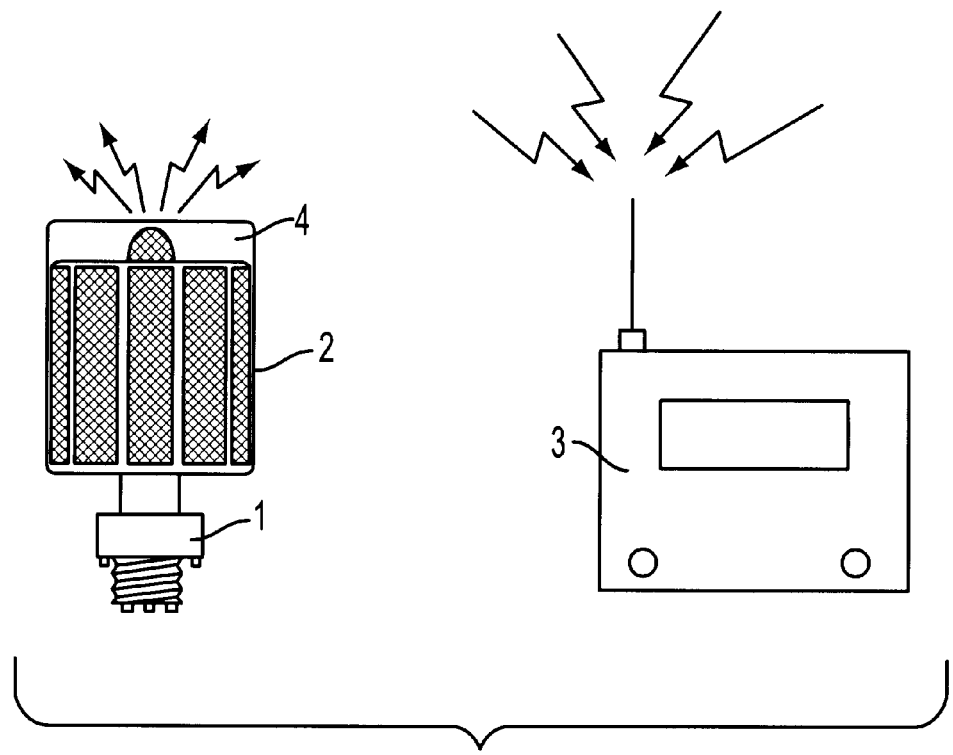
Figure 2:
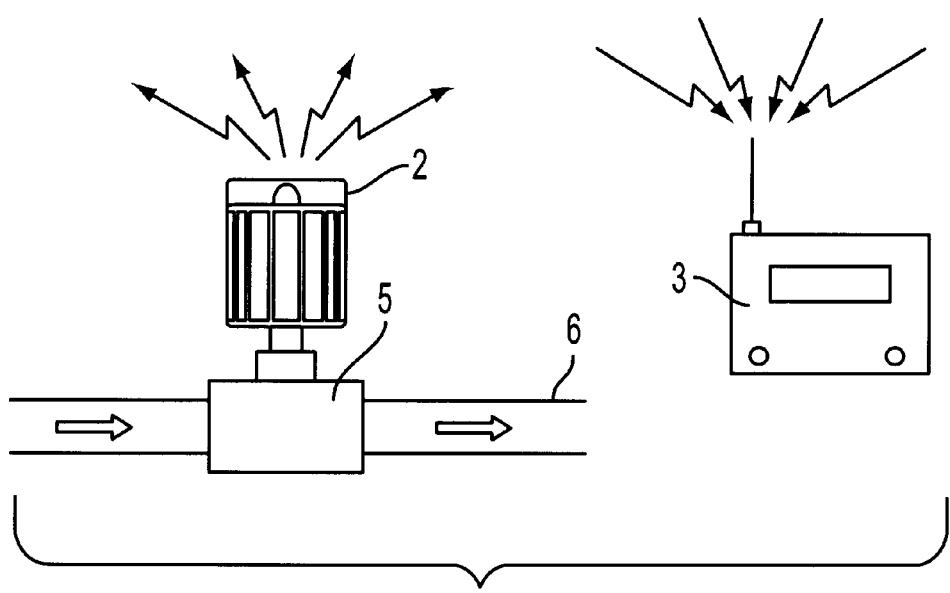
Figure 3:
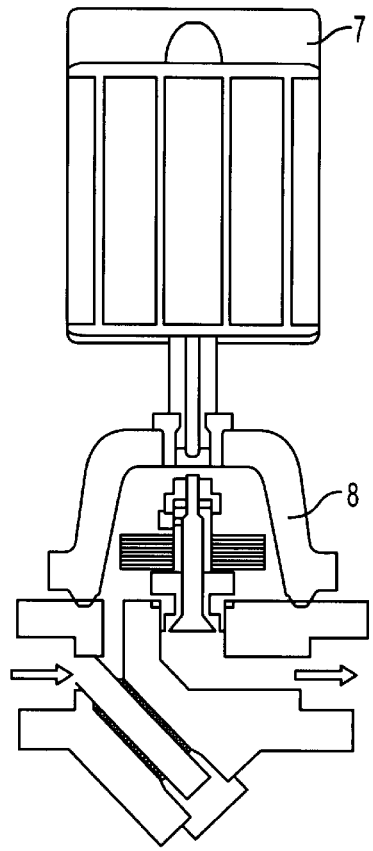
FIG. 3 shows a sample of the new prototype (7), object of this invention, mounted on the cover of a bimetallic thermostatic steam trap (8).
Figure 4:
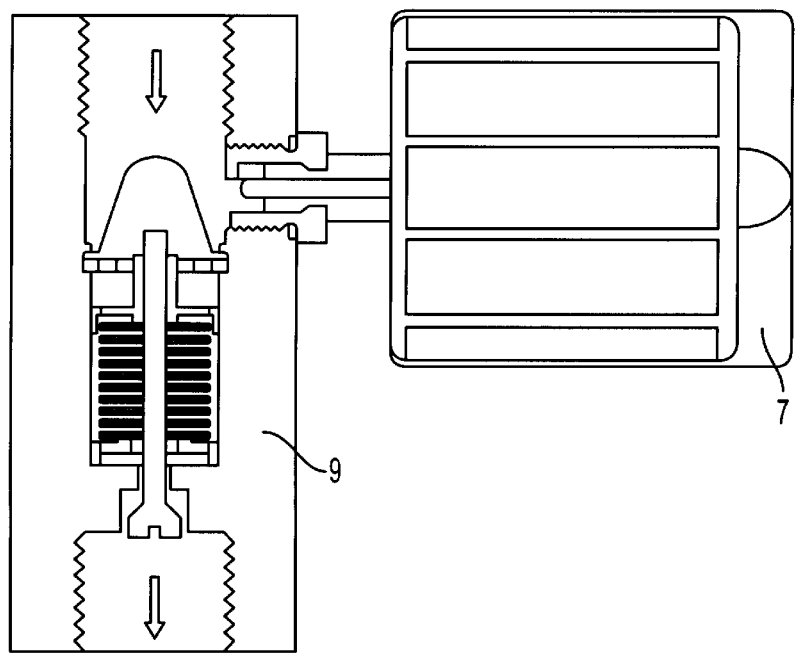
FIG. 4 shows a sample of the same system (7) mounted on a monobloc steam trap body (9). The assembly becomes the smallest and most powerful and reliable steam trap system and energy control system available within the field of steam trap technology in the state of art.

The application of the new prototype, object of this invention, to thermostatic steam traps with external adjustment during operation provides an excellent purging system in which the complementary action of both elements result in a very effective operation avoiding the risk of energy loss and with a reduced maintenance and a very low cost for spares.

What is claimed is:

1. A monitoring system comprising:

a sensor that senses temperature, pressure, conductivity and ultrasound;

a body housing the sensor, the body having a connector adapted to be connected to a pipe, valve or steam trap; and an electronic analyzer mounted on the body that analyzes signals sensed by the sensor and indicates information.

2. The system of claim 1 wherein the electronic analyzer comprises:

electronic analysis and control circuits that generate a warning concerning pressure, temperature, conductivity and ultrasound.

3. The system of claim 2, further including:

a transmitter connected to the analyzer that broadcasts signals produced by the analyzer; and a remote receiver that receives signals broadcast by the transmitter.

4. The system of claim 3, wherein said signals are broadcast in a wireless manner.

5. The system of claim 2, wherein said analyzer further comprises:

a battery system; and photovoltaic cells that charge the battery system.

6. A monitoring system comprising:

a sensor that senses temperature, pressure, conductivity and ultrasound;

a body that houses the sensor and is adapted to be connected to an installation containing a fluid; and an electronic analyzer mounted on the body that analyzes signals sensed by the sensor and indicates information.

* * * * *